Figure 1:
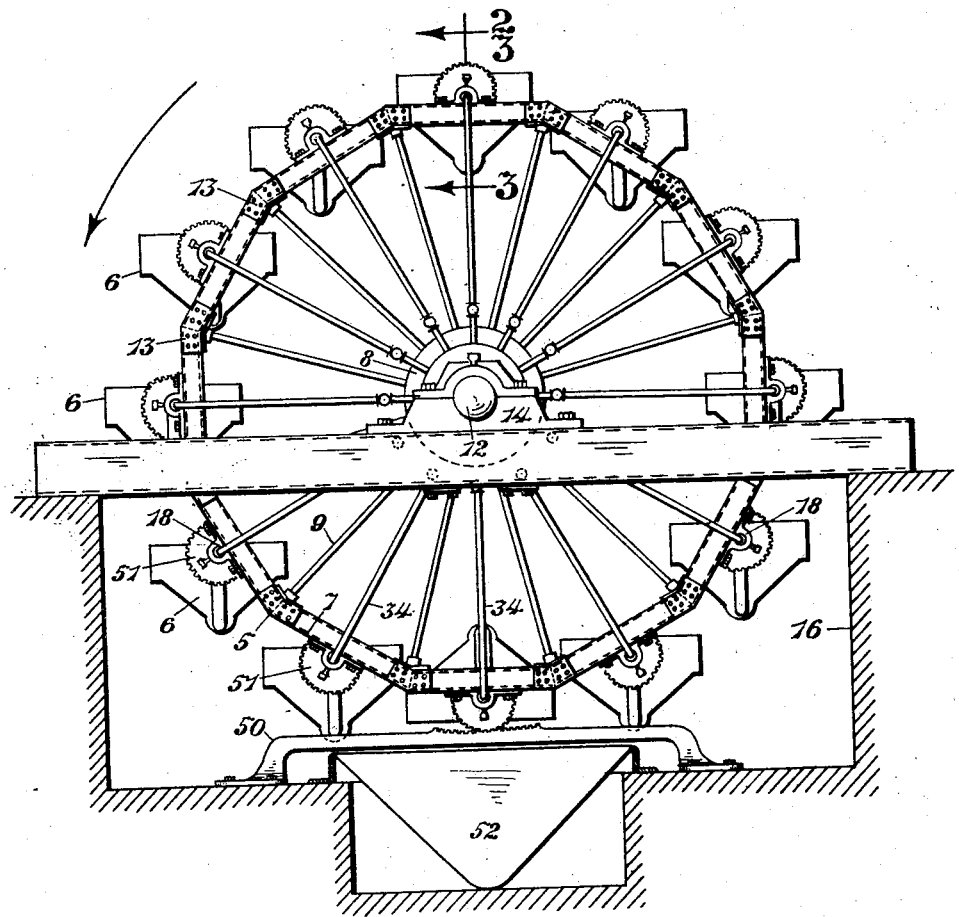

Oct. 16, 1928.

W. C. GRAHAM 1,687,863

FILTER

Filed July 26, 1924      3 Sheets-Sheet 1

INVENTOR.
W. C. Graham.

BY
ATTORNEY.

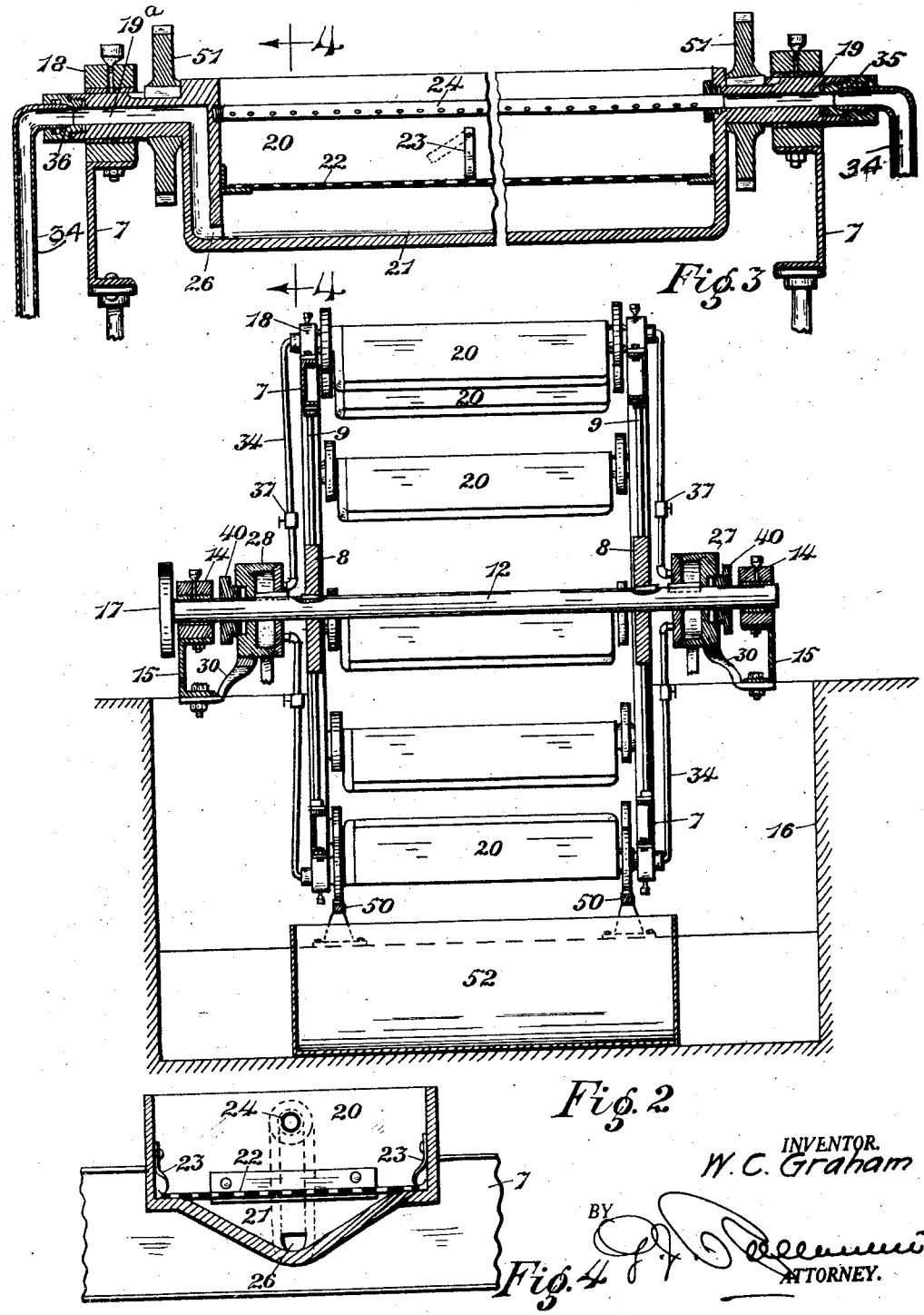

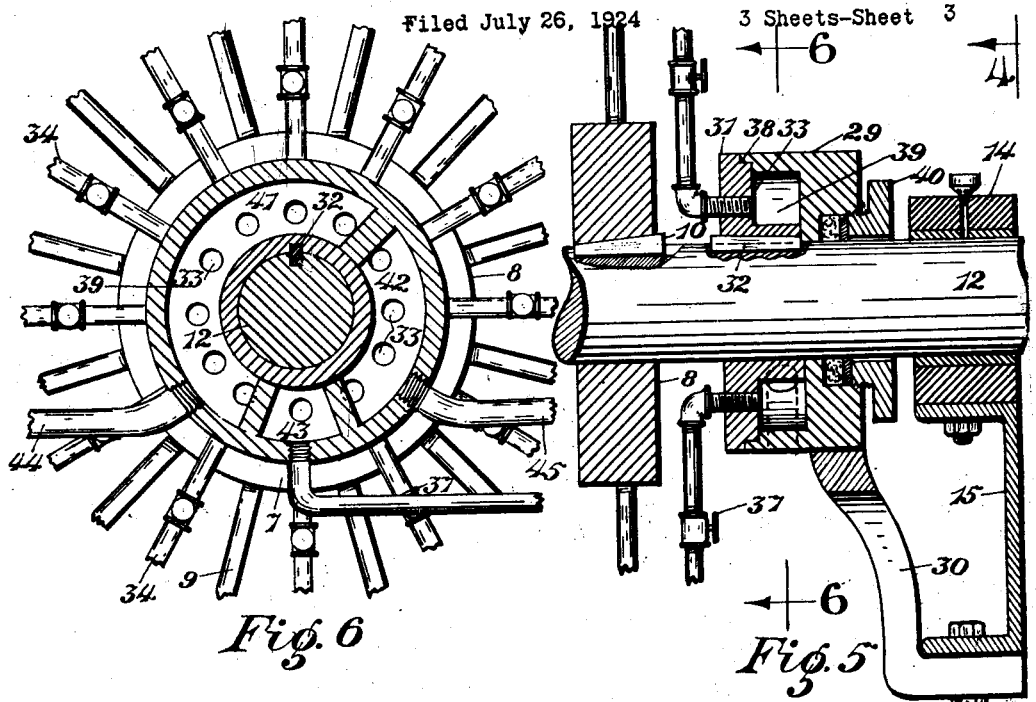
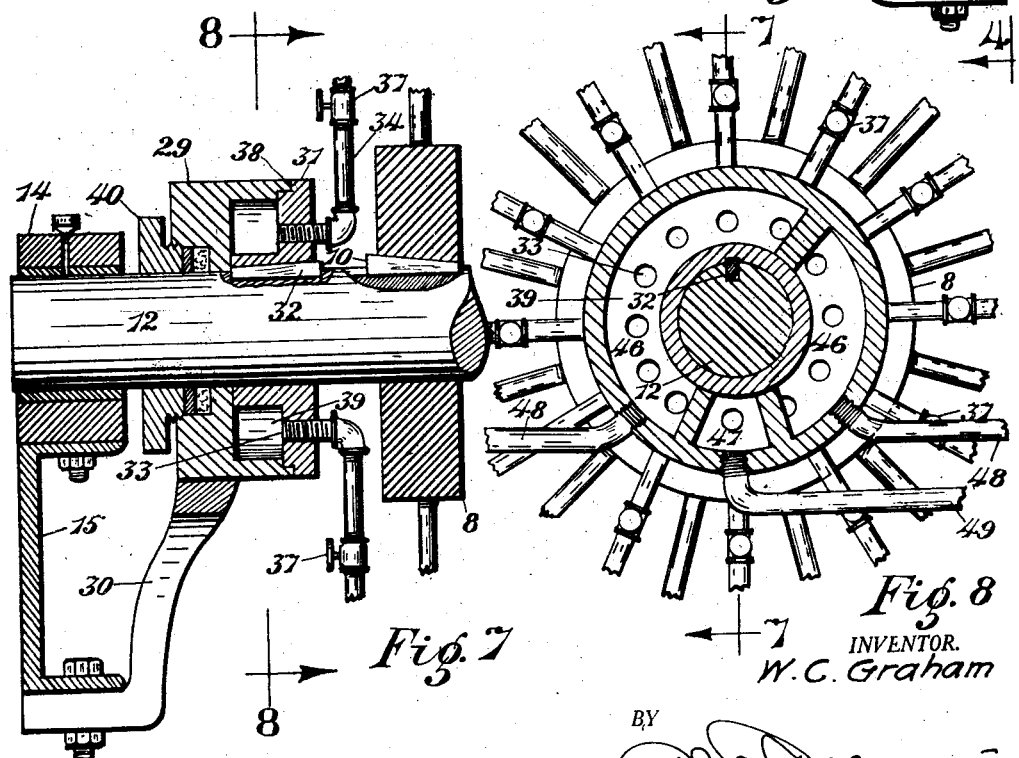

Patented Oct. 16, 1928.

1,687,863

UNITED STATES PATENT OFFICE.

WALTON C. GRAHAM, OF DENVER, COLORADO.

FILTER.

Application filed July 26, 1924. Serial No. 728,454.

My invention relates to vacuum filters of the character used for the separation of solids from liquids in different industries, and its primary object is to provide a mechanism for the filtration of materials in individually operating units, which combines simplicity of construction with high efficiency, great capacity and economy in operation.

In comparison with other filters of the same general class, at present in common use, my improved filter has many advantages as will fully appear in the course of the following description.

An embodiment of my invention has been illustrated in the accompanying drawings in the several views of which like parts are similarly designated and in which—

Figure 1 represents a front elevation of my improved filter in its preferred form;

Figure 2, a vertical section along the line 2—2, Figure 1;

Figure 3, a fragmentary longitudinal section through one of the tray units of the filter, as on the line 3—3 in Figure 1, drawn to an enlarged scale;

Figure 4, a transverse section through the tray unit taken on the line 4—4, Figure 3;

Figure 5, an enlarged sectional elevation of the valve mechanism at the right-hand side of the filter as shown in Figure 2;

Figure 6, a section taken on the line 6—6, Figure 5;

Figure 7, an enlarged sectional elevation of the valve mechanism at the left-hand side of the filter; and Figure 8, a section along the line 8—8, Figure 7.

Referring further to the drawings, the reference numeral 5 designates an endless carrier preferably made in the form of a wheel, which supports a series of filter units 6 equidistantly spaced at its periphery.

The wheel as shown in the drawings, comprises two sections each composed of a rim 7 connected by radial spokes 9 to a hub 8 which by means of a key 10 or other suitable fastening appliance, is fixed upon a horizontally supported shaft 12.

The rim of the wheel is made up of end-to-end adjoining straight pieces of angle-section which are rigidly connected by riveted plates 13 and the spokes are preferably arranged to connect with the rim at the points of connection of its members as shown in Figure 1.

The shaft is supported in boxes 14 mounted on horizontal beams 15 of channel-section laid across a pit 16 in which the lower portion of the wheel extends, and it carries at one of its ends a pulley 17 for its connection with a motor or other source of mechanical energy.

Fastened centrally of each member of the rims of the two wheel-sections at the periphery thereof, are boxes 18 for the support of the filtering units which are horizontally disposed in the space between the sections.

The units consist of elongated hopper-shaped trays which are loosely suspended from the rims of the wheel sections by hollow trunnions 19 and 19$^a$ passing through the boxes 18.

The center of gravity of the trays is below their axes of rotation so that during rotation of the wheel, they will constantly maintain their upright position unless they are mechanically inverted for the discharge of their contents as will hereinafter be more fully described.

The trays are divided into two compartments 20 and 21 by a horizontally disposed filter plate 22 which is removably held in place by clips 23 or other suitable means, and the hollow trunnions at opposite ends of the trays are each connected with one of said compartments as best shown in Figure 3. Thus, the trunnion at the right-hand end of the tray connects with the upper compartment through the medium of a perforated pipe 24 and the trunnion at the opposite end of the tray is connected with the lower compartment by means of a passage 26, the pipe 24 being supported longitudinally of the tray and in parallel relation to the filter plate.

The filtering medium may be composed of a cloth-covered frame or plate or it may consist of any other porous or foraminous substance similarly or otherwise mounted or constructed as may be found most suitable for the filtration of the particular material under treatment.

Mounted at opposite sides of the rotary wheel are the valves 27 and 28 which in the operation control the flow of material, wash waters and pressure fluids to and from the several tray units.

The valves are in construction and mode of operation similar to other valves heretofore used in filtering machines for an equivalent purpose and but a brief explanation will suffice to convey a clear understanding of their functions in the operation of the present invention.

Each valve consists of a stationary member 29 immovably mounted upon a suitable support 30, and a rotary member 31 which is connected to the shaft of the wheel by a key 32. The rotary member has a circular series of equidistant openings 33 which by means of radially arranged pipes 34 are separately connected to the hollow trunnions of the several filtering trays.

An air and water tight connection between the trunnions and the respective pipes is established through the medium of a ground joint as shown at 35 and 36 or any other expedient serving to adapt the trays for free pivotal movement to maintain their horizontal position during rotation of the wheel and to reverse their position for the purpose of discharging the solid residue of the material after filtration, as will hereinafter be explained.

Each pipe is further more provided with a valve 37 so that in case any one or more of the units are incapacitated or in case it is desired to reduce the output of the machine, the fluid-flow to and from any unit may be discontinued without interference with the operation of the machine as an entirety.

The movable member of the valves 27 and 28 is connected with the respective stationary member by an air and water tight joint as indicated at 38 in the drawings, and one or both of the members are hollowed to provide chambers 39 in connection with the openings 33 in which the pipes 34 are connected. A stuffing box 40 applied to the stationary member of the valves prevents leakage of fluid through its opening around the shaft.

The chamber of the valve at the right-hand side of the machine is divided into separate compartments 41, 42 and 43 one of which is connected with the source of supply of material to be filtered by a pipe 44 and another of which connects with a source of water-supply by means of a conduit 45.

The valve-chamber at the left-hand side of the machine is similarly divided into three compartments two of which, designated by the numeral 46, are connected with a vacuum pump or other suction appliance by pipes 48 while the compartment 47 is by means of a pipe 49 placed in communication with the source of water hereinbefore referred to or with a source of other fluid under pressure capable of dislodging the filter cake at the termination of the cycle of operations of the machine.

The compartments of the chambers and their interposed partitions are proportioned so that by rotation of the movable members of the valves with the wheel the pipes connecting the chambers with the filtering units are during predetermined periods of each revolution of the wheel brought successively in communication with each compartment separate from the others.

The duration of the periods of communication of the pipes with the different compartments of the valves may be varied by making one or more of their partitions circularly adjustable. This, however, is a common expedient in valves of this character and it has not been thought necessary to either show or describe this feature in connection with the present invention.

In order to periodically remove the solid residue of filtration formed in the upper compartments of the filtering units, means are provided to invert the units at regular intervals in the cycle of operations above a receiver into which the residue is discharged.

Different means may be devised to accomplish this purpose for the discharge of the filter cakes either one or more times during each revolution or at intervals of two or more revolutions as may be found to be most desirable for the treatment of different materials.

The mechanism illustrated in the drawings consists of a pair of segmental racks 50 disposed below the wheel and adapted to mesh with gear wheels 51 mounted upon the trunnions of the filtering trays at opposite ends thereof. A receiver 52 is placed below the units to receive the filter cakes which are discharged from the upper compartments of the units when they are inverted by the engagement of the respective gear wheels with the racks as shown in Figure 1.

In the operation of my invention, the wheel is rotated in the direction of the arrow in Figure 1, at a velocity sufficiently slow to permit of a substantially complete separation of the liquid from the solids in the material supplied to the filtering units, during a determinate cycle of operation which in the construction illustrated in the drawings, extends over the period covered by one revolution of the wheel.

By the operation of the valves 27 and 28 as hereinbefore explained, the liquid material is fed into the upper compartments of the units at the rising side of the wheel through the perforated pipes 24 while at the same time the air is exhausted from the lower compartments through the outlets 26.

The suction draws the liquid of the material through the meshes of the filtering plates and out through the vacuum pump to a conveniently located filtrate-reservoir, and the solids retained in the upper compartments are compacted in the form of cakes upon the plates.

At a determinate point in the circular movement of the units, the supply of material is discontinued by the respective opening 33 of the valve 27 moving out of connection with the compartment 41 and a wash water is supplied to the units through the pipes 24 by registration of the said openings with the compartment 42 for the purpose of removing any soluble matter that remained in the cakes on the filtering plates.

When the units at the descending side of the wheel approach the lowest point in their circular movement their connection with the supply of wash water is discontinued and their compartments are brought into communication with a source of pressure fluid, either liquid or gaseous, by the connection of the conduits 34 leading to the pipe 24 and the passage 26 with the compartments 43 and 47.

The connection of the units with the vacuum pump is at the same time interrupted in the valve 28 and the units are inverted by the engagement of their gear wheels 51 with the rack bars 50.

The combined actions of the pressure fluids injected through the perforations of the pipe 24 and through the passage 26, dislodge the filter cakes from the plates upon which they were formed and causes the cakes to fall into the receiver 52 from where they may be removed by any suitable means.

Upon the disengagement of the gears and the racks, the units automatically resume their original upright position owing to the location of their center of gravity below their pivotal axes and the above described operation is repeated.

It will be apparent that if so desired, the pressure fluid above referred to may be a liquid obtained from the same source which supplies the wash water for the removal of soluble matter from the filter cakes and that under favorable conditions it may suffice to supply the fluid for the dislodgement of the cakes through the pipes in the lower compartments of the filter units only.

It will also be observed that by a somewhat different arrangement of the compartments of the automatic valves, the wash water drawn through the solids in the trays, may be delivered into a reservoir separate from that to which the filtrate is conducted, under the influence of the partial vacuum maintained in the lower compartment of the units during the supply of both the material and the water and that by continuing the supply of pressure fluid for a short period after the cakes have been removed, through either one or both of the pipes of the compartments of the filter units, the filtering medium is thoroughly cleansed during each cycle of operation and the machine is thus constantly maintained in a condition of maximum efficiency. This, however, is not a new expedient since the same action takes place in many filtering machines of the rotary drum type used heretofore.

Having thus described my invention, what I claim and desire to secure by Letters Patent is:

1. A filter comprising a moving carrier, a trunnioned filter tray movably mounted thereon, a filtering medium dividing the tray into upper and lower compartments, conduits connecting the trunnions of the tray with the two compartments respectively, and valve means adapted to connect the trunnion connected with the lower compartment, with suction means and to connect the other trunnion consecutively with a feed supply and a source of water supply during determinate periods in the movement of the carrier.

2. A filter comprising a moving carrier, a filter unit movably mounted thereon, a supply conduit discharging in the unit, and a valve adapted to connect the conduit consecutively with a feed supply and a source of water supply during determinate periods in the movement of the carrier.

3. A filter comprising a moving carrier, a filter tray movably mounted thereon, a filtering medium dividing the tray into upper and lower compartments, a conduit discharging in the upper compartment, and valves for connecting the lower compartment with a suction means and simultaneously connecting the conduit consecutively with a feed supply and a source of water supply during determinate periods in the movement of the carrier.

4. A filter comprising a moving carrier, a filter unit movably mounted thereon, a filtering medium dividing the unit into upper and lower compartments, means for inverting the unit at a predetermined point in the movement of the carrier, and a valve element for connecting the compartments respectively with a source of fluid pressure and a source of water supply while the unit is inverted.

5. A filter comprising a moving carrier, a filter unit movably mounted thereon, a filtering medium dividing the unit into upper and lower compartments, means for inverting the unit at a predetermined point in the movement of the carrier, and valve means for connecting the upper compartment consecutively with a feed supply and with a source of water supply during determinate periods in the movement of the carrier and with a source of water supply during the period of inversion, and for connecting the lower compartment with a suction means during the periods of consecutive supply of feed and water and with a source of pressure fluid while the unit is inverted.

6. A filter comprising a moving carrier, a filter unit movably mounted thereon, a filtering medium dividing the unit into upper and lower compartments, means for inverting the unit at a predetermined point in the movement of the carrier, and valves connecting the upper compartment with a feed supply during a determinate period in the movement of the carrier, and connecting the lower compartment with a suction means during said period of supply, and with a source of pressure fluid during the period of inversion.

In testimony whereof I have affixed my signature.

WALTON C. GRAHAM.